(No Model.)
R. INSLEY.
CULTIVATOR.
No. 402,247.
Patented Apr. 30, 1889.
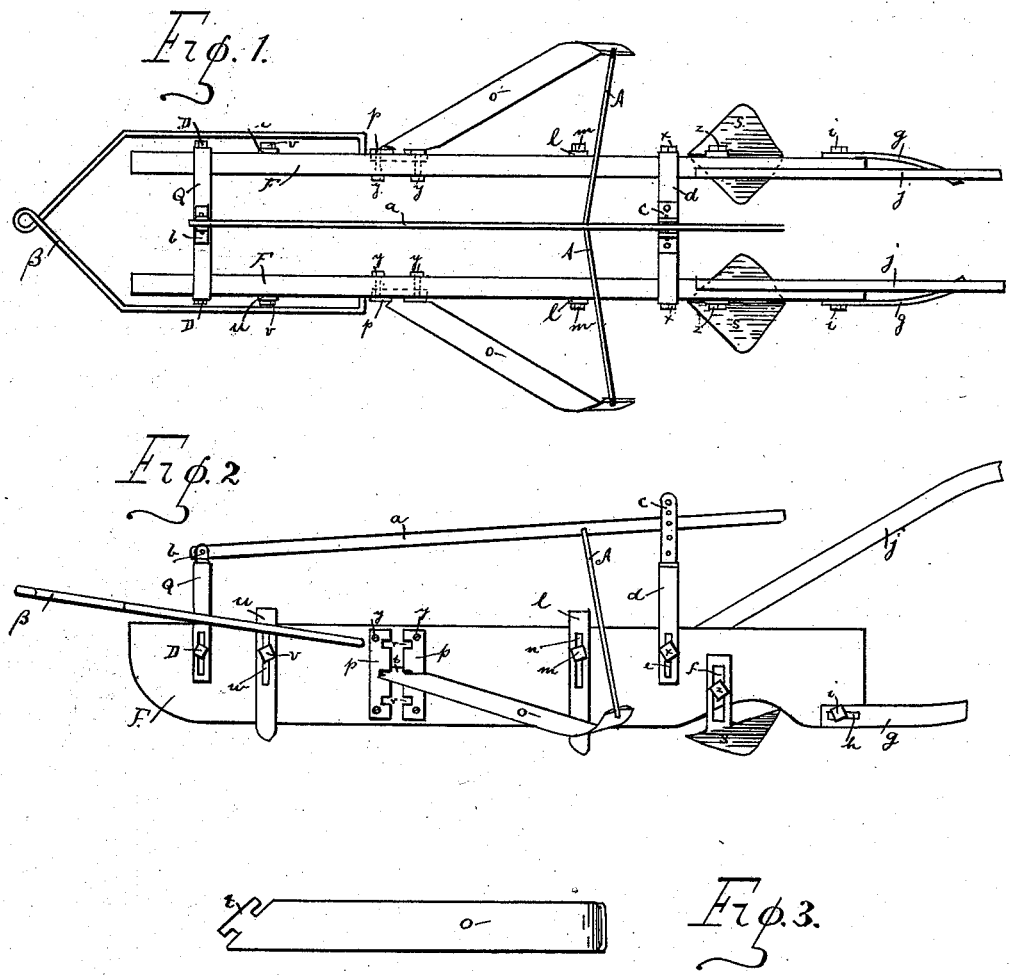
Witnesses,
John A. Morrison
P. F. C. Diehl
Inventor.
Robt. Insley.
per H. W. Stockpole
His Attorney.

UNITED STATES PATENT OFFICE.

ROBERT INSLEY, OF BATEHAM, KANSAS.

CULTIVATOR.

SPECIFICATION forming part of Letters Patent No. 402,247, dated April 30, 1889.

Application filed January 8, 1889. Serial No. 295,724. (No model.)

*To all whom it may concern:*

Be it known that I, ROBERT INSLEY, a citizen of the United States, residing at Bateham, in the county of Clay and State of Kansas, have invented certain new and useful Improvements in Cultivators; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to improvements in cultivators; and the objects are to provide a cultivator which can be easily adjusted to cut the weeds and stir the soil both near the corn and between the rows, and at the same time draw sufficient soil to the plants. I attain these objects by means of the mechanism hereinafter described and illustrated in the accompanying drawings, in which—

Figure 1 is a plan of my invention; Fig. 2, a side elevation of same, and Fig. 3 a plan of the knife $o$.

Similar letters of reference indicate like parts.

The runners or side pieces, F F, and arched cross-pieces $q$ and $d$ constitute the body or frame of my proposed cultivator. To the sides of said runners F F are attached colters $l\ l$ and $u\ u$, which, having slots $n\ n$ and $w\ w$, respectively, are adjustable vertically on their respective bolts $m\ m$ and $v\ v$. To the sides of said runners are removably secured plates $p\ p$, having notches $r\ r$, corresponding depressions or grooves being made in said runners, said depressions extending beneath said plates lengthwise of said runners sufficient to receive the head $t$ of the knife $o$, thus forming a hinge and allowing said knives $o\ o$ to be raised or lowered by means of the lever $a$, connected therewith by means of the rods A A. The position of said knives $o\ o$ may be changed by removing one or both of the screw-bolts $y\ y$, thus allowing the plates $p\ p$ to be swung apart, so that the head $t$ of the knife $o$ may be removed and placed in an upper or lower slot, as desired, and the plates $p\ p$ again secured in their places. One end of said lever $a$ is hinged by means of a bolt to the bracket $b$, secured to the arched cross-piece $q$, and the other end plays freely in the bracket C, which is provided with adjusting-holes and secured to the arched cross-piece $d$. A corresponding hole in said lever permits the operator after raising or lowering said knives $o\ o$ to secure the same in the desired position by passing a bolt through the proper holes in said bracket C, including the hole in the lever.

$s\ s$ are shovels adjustably secured by bolts $z\ z$ through the slotted arms $f\ f$ to the sides of and extending sidewise under said runners, by which the soil directly beneath and at the sides of said runners is stirred, the under side of said runners being grooved or hollowed at this point to allow the dirt to pass freely over said shovels. Coverers $g\ g$ are secured to the rear ends of said runners by bolts $i\ i$ through slots $h\ h$. Said cross-pieces $q$ and $d$ are adjustably secured to said runners—the former by means of the bolts D D, passing through the slots $k\ k$, and the latter by the bolts $x\ x$, passing through the slots $e\ e$. The handles $j\ j$, for guiding the cultivator, and the draft-connection B, together with the parts above described, constitute my device.

Having thus described my invention, what I claim as new, and desire to secure by Letters Patent, is—

1. In a cultivator provided with runners F F and cross-pieces $q$ and $d$, the combination therewith of the adjustably-secured colters $l\ l$ and $u\ u$, and knives $o\ o$, adjustably hinged to said runners and connected by the arms A A with the lever $a$, pivoted at one end to the cross-piece $q$, and the other playing freely in the bracket C, secured to the cross-piece $d$, substantially as shown and described.

2. In a cultivator provided with runners F F and cross-pieces $q$ and $d$, the combination therewith of the adjustably-secured colters $l\ l$ and $u\ u$, the shovels $s\ s$, adjustably secured to said runners and extending beneath the same, and the coverers $g\ g$, adjustably secured to the rear ends of said runners, substantially as shown and described.

3. In a cultivator provided with runners F F, the combination therewith of the cross-pieces $q$ and $d$, colters $l\ l$ and $u\ u$, knives $o\ o$, shovels $s\ s$, and coverers $g\ g$, each adjustably secured to said runners, substantially as shown and described.

4. In a cultivator provided with runners F F and cross-pieces $q$ and $d$, the combination therewith of the colters $l\ l$ and $u\ u$, knives $o\ o$, arms A A, lever $a$, pivoted to the cross-piece $q$ and playing freely in the bracket C, secured to the cross-piece $d$, the shovels $s\ s$, coverers $g\ g$, handles $j\ j$, and draft-connection B, all substantially as shown and described.

In testimony whereof I affix my signature in presence of two witnesses.

ROBERT INSLEY.

Witnesses:
JOHN A. MORRISON,
T. SCOTT MORRISON.